United States Patent
Kozat (10) Patent No.: US 7,839,851 B2
(45) Date of Patent: Nov. 23, 2010

(54) METHOD AND APPARATUS FOR OPPORTUNISTIC MULTICASTING WITH CODED SCHEDULING IN WIRELESS NETWORKS

(75) Inventor: Ulas C. Kozat, Santa Clara, CA (US)

(73) Assignee: NTT Docomo, Inc., Tokyo (JP)

( * ) Notice: Subject to any disclaimer, the term of this patent is extended or adjusted under 35 U.S.C. 154(b) by 256 days.

(21) Appl. No.: 11/957,724

(22) Filed: Dec. 17, 2007

(65) Prior Publication Data

US 2008/0152061 A1   Jun. 26, 2008

Related U.S. Application Data (60) Provisional application No. 60/876,903, filed on Dec. 22, 2006.

(51) Int. Cl.
*H04L 12/18* (2006.01)

(52) U.S. Cl. .................. 370/390; 375/240.24; 375/358

(58) Field of Classification Search ................. 370/312, 370/462; 455/562.1, 3.06, 502–503; 725/74, 725/78, 81

See application file for complete search history.

(56) References Cited

U.S. PATENT DOCUMENTS

| | | | |
|---|---|---|---|
| 6,614,366 B2 | 9/2003 | Luby | |
| 6,895,216 B2 * | 5/2005 | Sato et al. | 455/3.06 |
| 2003/0156540 A1 | 8/2003 | Trossen et al. | |
| 2004/0101274 A1 | 5/2004 | Foisy et al. | |
| 2004/0160979 A1 * | 8/2004 | Pepin et al. | 370/462 |
| 2006/0095944 A1 * | 5/2006 | Demircin et al. | 725/81 |
| 2007/0225044 A1 * | 9/2007 | Law et al. | 455/562.1 |

(Continued)

FOREIGN PATENT DOCUMENTS

EP       1 154 660 A     11/2001

(Continued)

OTHER PUBLICATIONS

Gopala et al., "Opportunistic Multicasting" Thirty-Eighth Asilomar Conference on Signals, Systems and Computers, Nov. 2004, 5 pages.

(Continued)

*Primary Examiner*—Dang T Ton
*Assistant Examiner*—Mohamed Kamara
(74) *Attorney, Agent, or Firm*—Blakely, Sokoloff, Taylor & Zafman LLP (57) ABSTRACT

A method, apparatus and system for opportunistic multicasting are described. In one embodiment, an apparatus for use in a wireless multicast system comprises: a storage to store channel state and/or rate information received from the plurality of receivers; an optional encoder to generate encoding blocks from the original multicast/broadcast content; a transmitter to broadcast information over a broadcast channel to receivers in the plurality of receivers for each transmission time slot; and a controller coupled to the storage and the transmitter to adapt transmission rates of the transmitter to cause the transmitter to transmit at different rates for different transmission time slots, wherein the controller determines a transmission rate of the transmitter that broadcasts the encoded information, based on the channel state information associated with the broadcast channel and received from the plurality of receivers and based on a subset of receivers in the plurality of receivers targeted to reliably receive a broadcast transmission over the broadcast channel during said each transmission time slot.

24 Claims, 5 Drawing Sheets

U.S. PATENT DOCUMENTS

2007/0233889 A1* 10/2007 Guo et al. .................. 709/231
2009/0307565 A1* 12/2009 Luby et al. .................. 714/780

FOREIGN PATENT DOCUMENTS

EP              1 248 480 A      10/2002

OTHER PUBLICATIONS

Sunay et al., "Wireless Multicast Packet Data Provisioning Using Opportunistic Multiple Access", in Proceedings of the IEEE Benelux Chapter Symposium on Communications and Vehicular Technology, Eindhoven, 2003, 8 pages.

Knopp et al., "Information Capacity and Power Control in Single-Cell Multiuser Communications", in Proceedings of ICC'95, Seattle, WA, Jun. 1995, pp. 331-335.

Sharif et al., "A Delay Analysis for Opportunistic Transmission in Fading Broadcast Channels", in Proceedings of Infocom '05, Miami FL, 2005, pp. 2720-2730.

M.G. Luby, "LT Codes", Digital Fountain Inc., (http://www.digitalfountain.com/technology/index.cfm), 10 pages.

A. Shokrollahi, "Raptor Codes", Digital Fountain Inc., (http://www.digitalfountain.com/technology/index.cfm), 38 pages.

P. Maymounkov, "Online Codes", New York University, Technical Report, TR2002-833, Oct. 2002, (http://pdos.csail.mit.edu/~petar/papers/maymounkov-online.pdf), 15 pages.

Luby et al., "Efficient Erasure Correcting Codes", IEEE Tan. on Information Theory, vol. 47, No. 2, Feb. 2001, pp-569-584.

European Office Action for European Patent Application No. 07863049.8, dated Jul. 3, 2009, 5 pages.

Korean Office Action for corresponding Korean Patent Application No. 2008-7025367, dated Jul. 1, 2010, 5 pages.

* cited by examiner

METHOD AND APPARATUS FOR OPPORTUNISTIC MULTICASTING WITH CODED SCHEDULING IN WIRELESS NETWORKS

PRIORITY

The present patent application claims priority to and incorporates by reference the corresponding provisional patent application Ser. No. 60/876,903, titled, "A Method and Apparatus for Opportunistic Multicasting with Coded Scheduling in Wireless Networks," filed on Dec. 22, 2006.

RELATED APPLICATIONS

This application is related to U.S. patent application Ser. No. 11/605,812, entitled "A Method and Apparatus for Layered Rateless Coding," filed on Nov. 27, 2006; U.S. Patent Application Ser. No. 60/927,814, entitled "Hybrid and Improved Approaches to Layered Rateless Coding," filed on May 4, 2007; U.S. Patent Application Ser. No. 11/873,248, entitled "Information Delivery Over Time-Varying Network Topologies," filed on Oct. 16, 2007; U.S. Patent Application Ser. No. 60/906,999, entitled "A Method and Apparatus for Prioritized Information Delivery with Network Coding Over Time Varying Network Topologies," filed on Mar. 13, 2007, all assigned to the corporate assignee of the present invention.

FIELD OF THE INVENTION

The present invention relates to the field of multicast broadcasting; more particularly, the present invention relates to network multicasting with opportunistic scheduling and transmission rate adaptation in wireless networks.

BACKGROUND OF THE INVENTION

Consider a set of M receivers $RX=\{RX_1, RX_2, \ldots, RX_M\}$. At times, it is desirable to send the same information to each receiver in this set such that each receiver can recover the complete information and achieve a high throughput at the same time. Without loss of generality, suppose the time is divided into slots during which each receiver $RX_j \in RX$ observes a stationary channel quality represented by its average received signal to noise ratio $SNR_j(k)$ at $k^{th}$ slot. Assume that the transmitter knows the channel state (with some accuracy) of each receiver (e.g., via a feedback channel) at the start of a time slot. The channel state information (CSI) dictates how many bits per second (or bits per transmission) can be sent over that channel with a given reliability or achievability. For instance, the information theory states that a transmission rate of $C_x(k)=0.5 \log_2(1+SNR_x(k))$ can be achieved over an additive white Gaussian noise (AWGN) channel at receiver x. If the transmitter sends the information at a rate $R>C_x(k)$ during $k^{th}$ time slot, receiver x cannot recover the information sent during that slot. On the other hand, any information transmitted at rate $R<C_x(k)$ can be successfully recovered by x during $k^{th}$ time slot.

Suppose the receivers are ordered with respect to their channel qualities in descending order at the start of each time slot, i.e., $SNR_1(k) \geq SNR_2(k) \geq \ldots \geq SNR_M(k)$. The rate set by the transmitter at the beginning of the time slot then dictates which subset of receivers can recover the information sent during that time slot. The rate $R_L(k)$ is defined as the rate at which the receivers with the highest L channel qualities can indeed recover the broadcast information during slot k while the remaining (M−L) receivers cannot. For instance over AWGN channel under the ideal assumptions, $R_L(k)$ becomes equal to $0.5 \log_2(1+SNR_L(k))$. The set $RX_L(k)$ is defined as the subset of receivers that have the L highest channel quality values, e.g., SNR's, during $k^{th}$ slot. In other words, $RX_L(k)$ represents the set of receivers that can successfully recover the information transmitted at rate $R_L(k)$. For purposes herein, the indicator function I(x) is defined to be equal to 1 if x is true and 0, otherwise, e.g., if $x \in RX_L(k)$, then $I(x \in RX_L(k))=1$ and if $x \notin RX_L(k)$, then $I(x \in RX_L(k))=0$. With these definitions in mind, then one can write the average rate observed at receiver x in a frame of T slots as:

$$R_x(L,T) = \frac{1}{T}\sum_{k=1}^{T} R_L(k) \times I(x \in RX_L(k)).$$

Note that L and T are used as the system parameters here. Since $R_x(L,T)$ is a random variable, these parameters can be chosen to maximize the expected value of $R_x(L,T)$, i.e., $E[R_x(L,T)]$. When $R_L(k) \times I(x \in RX_L(k))$ is identically distributed, $E[R_x(L,T)]$ becomes independent of T, and maximization is carried out over L only. Typically, the maximum does not coincide with the extreme points where L=1 or L=M, but rather at an intermediate point. The location of maximum point is governed by the channel statistics.

If different users observe different channel statistics (e.g., one user may be closer to the transmitter than the others, some users may have a direct line of sight from the transmitter whereas others may not have, etc.), some users may benefit more at different values of L.

Opportunistic multicasting is well-known in the art. Some have suggested a strategy that sorts the users with respect to their channel qualities and selects the median user as the targeted channel quality level to set the transmission rate over the wireless channel. In this case separate transmission queues are used for every possible subset of receivers of cardinality N/2 (assuming N is even). For instance, for a 6 user system, where the users are numbered from 1 to 6, one can define C(6,2)=6!/2!/(6−2)!=15 different subsets of cardinality 2. For every subset A, one also has complementary subset $A^c=\{1,2,3,4,5,6\}/A$, e.g., the complementary subset of $\{1,4,5\}$ is $\{2,3,6\}$. Whenever a new information packet is received, the packet is copied onto two queues: the subset of receivers with the highest N/2 channel quality values (i.e., SNRs) and its complementary set. Assuming that each receiver has IID channel quality metrics, each subset has equivalent chances of being scheduled by the transmitter as dictated by the current channel state information. Since each packet is to be received by all the receivers, each queue to which the packet is copied must be scheduled at least once. This system mainly suffers from three problems. First, the system is not optimal and it considers a rate adaptation with respect to the median user only. Second, there is a waste of bandwidth when the transmitter targets more than N/2 receivers. In such a situation, one cannot find mutually exclusive subsets of receivers of the same size, and the proposed scheduling amounts to retransmission for some of the receivers. For instance, suppose that the optimal strategy was to target four best receivers out of six rather than the median user each time instant. If the optimal subset is $\{2,3,5,6\}$ (e.g., these are the receivers with the four highest average SNR values currently), the complementary subset is $\{1,4\}$ and its cardinality is less than four. So when a packet is scheduled for the subset $\{2,3,5,6\}$, it is copied to a queue that corresponds to a subset of cardinality four and that also includes $\{1,4\}$. However, when that queue is scheduled, it is guaranteed that at least two receivers will not have a new information and the transmission is wasted from their point of view. Third, the solution has exponential complexity with the number of users, since one needs to maintain an exponential number of queues.

Other opportunistic multicasting strategies that sends coded bitstreams are also known, but they either entail a transmission followed by recovery cycles or they are not work-conserving (i.e., transmitters can be idle until a good enough transmission opportunity arises).

Literature exists in opportunistic scheduling but this literature proposes its use for unicast flows, where each receiver demands independent streams of information over a fading broadcast channel.

Also note that erasure codes, rateless codes, and their applications are known in the art.

SUMMARY OF THE INVENTION

A method, apparatus and system for opportunistic multicasting are described. In one embodiment, an apparatus for use in a wireless multicast system, comprises: a storage to store channel state and/or rate information received from the plurality of receivers; an optional encoder to generate encoding blocks from the original multicast/broadcast content; a transmitter to broadcast encoded information over a broadcast channel to receivers in the plurality of receivers for each transmission time slot; and a controller coupled to the storage and the transmitter to adapt transmission rates of the transmitter to cause the transmitter to transmit at different rates for different transmission time slots, wherein the controller determines a transmission rate of the transmitter that broadcasts the encoded information, based on the channel state information associated with the broadcast channel and received from the plurality of receivers and based on a subset of receivers in the plurality of receivers targeted to reliably receive a broadcast transmission over the broadcast channel during said each transmission time slot.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for multicasting in a wireless network are described. In one embodiment, the multicasting includes coded scheduling. Embodiments of the present invention provide significant capacity gains for wireless networks where the same information is multicasted to multiple receivers. In wireless networks, since the medium is inherently a broadcast one, the information sent by the transmitter is simultaneously received by many users. However, each receiver observes a different and, in general a time-varying channel quality, which determines the maximum rate deliverable to each receiver at a given time instant. Under these conditions, different transmission strategies are used to achieve different short-term and long-term multicast throughput per user. At one extreme, one can transmit with respect to the worst case user to guarantee that everyone can successfully recover the information sent at each transmission. Since the channel quality of the worst case user can be significantly lower than many other users in the system, this strategy can result in very low rate transmission for everyone, thereby penalizing the users with much better supportable channel rates. At the other extreme point, a transmitter can opportunistically target only the user with the best channel quality at each transmission opportunity, thereby maximizing the transmission rate at each time instant. The downside of such a strategy is that only the best case user can successfully recover the information at each transmission opportunity and users have to wait until the channel conditions favor them. This waiting period can bring down the multicast throughput per user significantly. Hence often a better strategy, which is referred to herein as "opportunistic multicasting," carefully balances the instantaneous transmission rates and the per user waiting time at the scheduler by focusing on a larger set of users but filtering out the users with very low channel qualities.

Although opportunistic multicasting provides substantial throughput increase by utilizing the spread of channel quality across space and time (i.e., multi-user diversity), the scheduler at the transmitter must ensure that the same broadcast information is received at each receiver. In one embodiment, this is accomplished by coordinating transmissions carefully. In one embodiment, the system keeps track of what information is received by which set of users at any one time, and, given this information, as well as the current channel state, the scheduler decides which information to send according to which subset of receivers (users) still need to receive the data.

In one embodiment, a fixed rate or a rateless erasure code is used that allows a receiver to recover the complete broadcast information as long as a receiver can successfully recover enough number of transmitted encoding blocks. In such a case, while the system has to keep track of less information, the system also is naturally resilient to transmission errors. One embodiment of the present invention does not depend on a particular implementation of these codes and does not claim to provide a new coding technique. One embodiment of the invention can use any of these codes jointly with optimized opportunistic multicasting to provide a simple, scalable (e.g., with the number of users), and optimal (e.g., do not waste any transmission opportunities due to retransmissions and wasted schedules) multicasting apparatus.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 1:
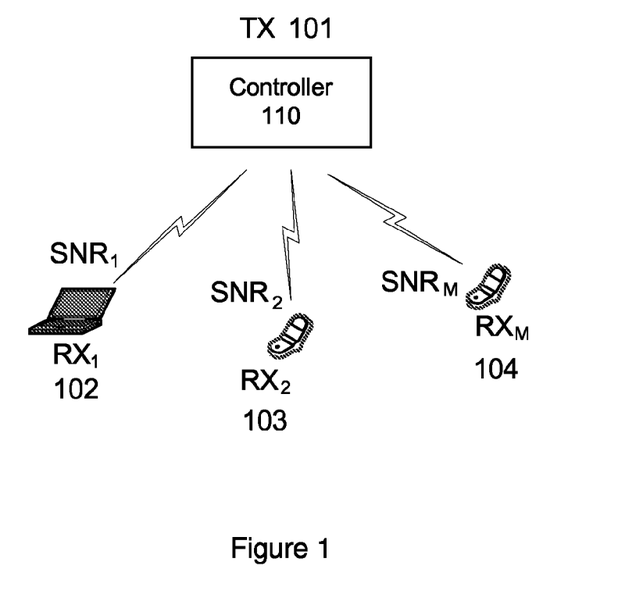
FIG. 1 is a block diagram of one embodiment of a wireless multicast system.

FIG. 1 is a block diagram of one embodiment of a wireless multicast system. Referring to FIG. 1, the wireless multicast system has one transmitter 101 that sends broadcast information over a broadcast channel and multiple receivers (nodes) 102-104 can receive over this broadcast channel. Thus, the same information is demanded by all receivers and the receivers listen and try to recover the broadcasted information. In one embodiment, the broadcast channel comprises a time slot, a frequency band, an OFDM subband, a spreading code, or a logical channel (e.g., a sequence of frequency bands or a set of time slots). Each receiver is able to listen to and receive on that channel. Note that although three receivers are shown, the present invention is not limited to systems having three receivers, and such systems may have any number of receivers (e.g., 4, 5, . . . 10, . . . 100, . . . ).

Each of receivers 102-104 experiences time-varying channel conditions. In one embodiment, the channel conditions are quasi-stationary and are known at both the receiver and transmitter 101 before the next slot starts. In one embodiment, a feedback mechanism provides the channel state information of receivers 102-104, which is indicative of the channel conditions, back to transmitter 101. The feedback mechanism may include a wireless channel or wired channel between receivers 102-104 and transmitter 101. While the feedback may be in the form of explicit communication of the received channel quality back to the sender, in another embodiment, the feedback is done implicitly at the sender by observing the reverse channel quality and using channel symmetry in the forward and reverse directions.

Transmitter 101 includes a controller 110 that controls transmitter 101. In one embodiment, controller 110 operates as a rate adapter to select different channel, or transmission, rates at which transmitter 101 transmits the broadcast information over the broadcast channel. In such a case, the selection of transmission rates occurs at each transmission epoch (e.g., time-slot). In one embodiment, controller 110 provides a rate adaptation capability that enables transmitter 101 to transmit at different rates depending on the channel state and the targeted reliability that exists. In one embodiment, this rate adaptation is provided in an opportunistic fashion by targeting a subset of receivers 102-104 at each transmission opportunity where the rate is set to satisfy the worst channel condition among the receivers of the targeted subset. In this case, the transmission rate that is set dictates which subset of receivers can actually recover the broadcasted information. In some cases, there can be one or more receivers that are not in the target set can observe a channel quality good enough to recover the multicast data at the set transmission rate. These receivers will then be able to recover the transmitted information and hence the subset of receivers that can actually recover the multicasted data in a given slot can be larger than the targeted subset. There can also be cases where a receiver who is originally in the targeted subset see a worse channel condition than the estimated one and hence in real operation cannot recover the data.

Figure 2:
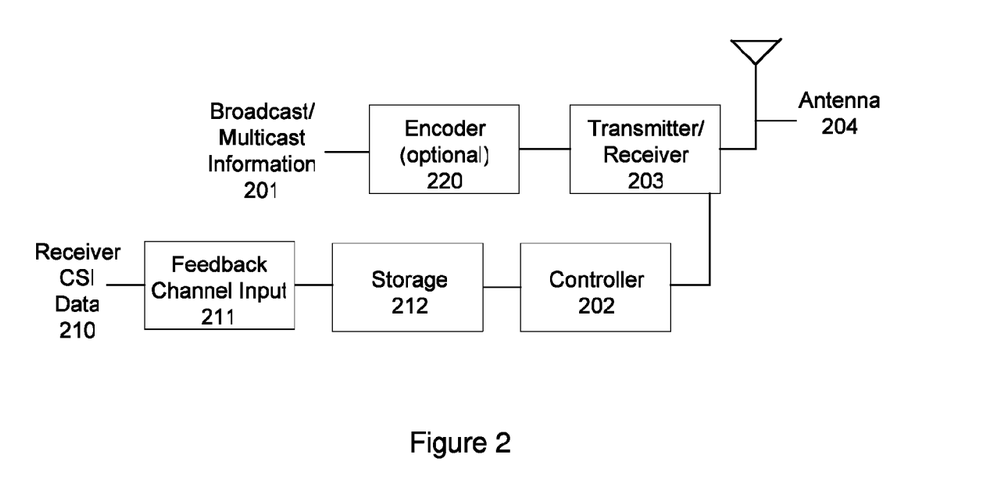
FIG. 2 is a block diagram of one embodiment of a transmission device.

FIG. 2 is a block diagram of one embodiment of a transmission device, such as transmitter 101. Referring to FIG. 2, the transmission device comprises a storage or other memory 212 to store channel state information 211 received from the plurality of receivers in the wireless multicast system, via feedback channel input 211. A wireless transmitter/receiver 202 is coupled to receive broadcast information 201 and broadcast it over a broadcast channel, via antenna 204, to receivers in the plurality of receivers of the multicast system for each transmission time slot.

Controller 202 is coupled to storage 212 and transmitter/receiver 203 to adapt transmission rates of the transmitter to cause the transmitter to transmit at different rates for different transmission time slots. In one embodiment, controller 202 determines a transmission rate of transmitter 203 that broadcasts the information, based on the channel state information 210 associated with the broadcast channel, received from the plurality of receivers, and stored in storage 212, and based on a subset of receivers in the plurality of receivers targeted to reliably receive a broadcast transmission over the broadcast channel during that transmission time slot.

In one embodiment, controller 202 adapts transmission rates of transmitter 203 by setting the transmission rate of transmitter 203 to satisfy the worst channel condition among the subset of receivers (of receivers 102-104 of FIG. 1). In another embodiment, controller 202 adapts transmission rates of the transmitter 203 by performing rate adaptation for multicast transmissions, including, for at least one multicast transmission to occur during a time slot, and setting that transmission rate of transmitter 203, where the transmission rate is that which serves the best L users in the time slot. Note that transmitter 203 transmits at the transmission rate for an entire duration of the time slot.

In one embodiment, controller 202 identifies the subset of receivers by sorting the plurality of receivers in the multicast system based on individual channel state information to create a sorted list, determining, based on the optimal order information, a value in the sorted list, and determining the subset of receivers to include all the receivers having an achievable transmission rate greater or equal to the value in the sorted list, given at least one of past channel state information history and a schedule of transmissions associated with all receivers in the plurality of receivers.

In another embodiment, controller 202 selects the subset of receivers by sorting achievable rates of each receiver in the plurality of receivers in the multicast system in an order for a next time-slot into a list, and then sets the transmission rate equal to one achievable rate of one receiver in the list, where the one achievable rate is the lowest achievable rate in a group that includes the highest achievable rates in the list, which are associated with a predetermined number receivers. In such a case, controller 202 schedules transmission of data for the next time-slot to receivers having a reliable transmission rate at or above the set transmission rate.

In one embodiment, controller 202 computes a capacity per channel for each receiver, sorts normalized versions of the capacities per channel for the group of receivers in the multicast system, and select a predetermined number of receivers from the sorted group of receivers, wherein the transmission rate is set according to a lowest transmission rates among transmission rates of receivers in the predetermined number of receivers. The normalization of a user's channel rate can take into account the average throughput sent to each receiver, inter-scheduling time of each receiver, average channel quality of each receiver, the actual throughput received by each receiver (where this received throughput is thereafter communicated back to the transmitter via a feedback channel), the application quality (e.g., rate-distortion measure) observed at the receiver, etc.

In one embodiment, controller 202 computes a function based on the channel state information of each receiver and sorts the receivers in the plurality receivers with respect to results of computing the function. In one embodiment, the function is based on channel state information and information related to past scheduling of transmissions to receivers (e.g., average throughput to each of the receivers). In another embodiment, the function corresponds to the capacity of each receiver of the multicast system at the current time. In yet another embodiment, the function corresponds to the capacity of each receiver at the current time in relation to an expanded capacity (e.g., average of all receivers). In still another embodiment, the function corresponds to the capacity of each receiver at the current time in relation to the throughput to the receiver.

In one embodiment, the transmission device comprises an encoder 220 to generate encoded blocks from broadcast/multicast information 201. In one embodiment, encoder 220 uses a fixed rate erasure code. In one embodiment, the fixed rate erasure code uses the channel state information and the schedule history to generate the encoded blocks. In another embodiment, encoder 220 uses a rateless code. In either case, transmitter 203 transmits the encoded blocks to the subset of receivers out of all the receivers in the multicast system. In one embodiment, the rateless code uses the channel state information and the schedule history to generate the encoded blocks. In one embodiment, encoder 220 also performs buffering function to accumulate enough broadcast/multicast blocks to the erasure code encoder. Encoder 220 is typically used when the broadcast/multicast information is not already encoded at another node. In one embodiment, a system implements all the blocks in FIG. 2 at one node. In another embodiment, the blocks and functions are distributed across many nodes, in which case a proper control signaling mechanism is used to guarantee that the scheduler transmits encoded information. In one embodiment, the source node where the multicast/broadcast information resides performs the encoding functions of encoder 220 and transmission device does not perform any encoding operation by itself. In one embodiment, the source node informs the transmission device whether the broadcast/multicast information is already encoded or not, depending on which transmission device passes the information through encoder 220. In another embodiment, the wireless transmission device completely disables encoder 220 and trusts that the source or some other node already sends erasure encoded (e.g., FEC protected) broadcast/multicast messages.

Subset and Transmission Rate Selection

To formulate the selection of the subset of receivers (nodes) and select the transmission rate, the channels are modeled. To formally state the model, the received signal yi(t) at time t for wireless user i can be written as:

$$y_i(t)=h_i(t) \cdot s(t)+n_i(t)$$

For purpose herein, s(t) denotes the multicast message sent by the transmitter with average power constraint $E[\|s(t)\|^2] \leq P$. The channel fading coefficient $h_i$ of user i is in general modeled as circularly symmetric complex Gaussian random variable, however we do not need to make such an assumption. Similarly, the additive noise $n_i$ is in general modeled as circularly symmetric complex white Gaussian noise with zero mean and unit variance. The channel fading coefficient $h_i$ remains the same during a time slot, and it is assumed to be known both at the receiver and the transmitter. $h_i$ may vary in an i.i.d. or correlated fashion from slot to slot. For two different users i and j, $h_i$ and $h_j$ are typically taken as independent processes. The additive noise $n_i$ on the other hand is always assumed to be i.i.d. across users.

Using this model, the capacity per channel use in slot k can be expressed as:

$$C_i[k]=B_1 \log_2(1+B_2 \cdot SNR_i[k])$$

where $SNR_i[k]=\|h_i[k]\|^2$ and it represents the average signal to noise ratio for user i during kth time slot. Here, $B_1$ and $B_2$ are coefficients that capture channel bandwidth, interference, receiver imperfections, etc. Note that whenever the transmitter sends at a rate $R[k]>C_i[k]$, node i cannot recover any of the transmitted information during slot k. In contrast, if the transmitter sets its rate to any value $R[k] \leq C_i[k]$, node i can recover all the information sent during slot k.

In one embodiment, the transmitter performs rate adaptation for multicast transmissions as follows. At the beginning of each time slot, transmitter sets its transmission rate R[k] and it keeps sending at the same rate for the duration of the time slot. Accordingly, the throughput capacity of user i until the end of nth time slot can be expressed as:

$$\Psi_i[n] = \frac{1}{n}\sum_{j=1}^{n} I_i[j] \cdot R[j]$$

For purposes herein, $I_i[j]$ is an indicator function that equals to one if user i can successfully receive in the jth slot and it is zero otherwise.

In one embodiment, for the IID case, when the channel conditions are i.i.d. across the users, the transmitter is constrained to choose a transmission rate to serve the best L users in each slot. L can be any value from 1 to N, but once it is fixed, it remains the same until the number of users in the system changes, the channel statistics change, or until the multicast session ends. To implement this, the capacities of users are ordered at the beginning of the next slot (n+1) such as $C_{(1)} \geq C_{(2)} \geq \ldots \geq C_{(N)}$, where the slot index has been omitted to avoid obscuring the present invention. The transmitter sets the channel rate for that next time-slot as the rate of the worst user that is in the group of the best L users, $R[n+1]=C_{(L)}$. Notice that R[n] becomes an i.i.d. random process. Furthermore $I_i[n]$ also becomes an i.i.d. random process, which is also independent from R[n]. This is due to the fact that any receiver is equally likely to be among the L best users given the i.i.d. channel statistics. Therefore, $I_i[n]=1$ with probability p=L/N and $I_i[n]=0$ with probability (1−p)=(1−L/N).

In such a case, the transmitter selects L* that optimizes the long-term throughput capacity using the following equation:

$$L^* = \operatorname{argmax}\left\{\frac{L}{N_L}E|C_{(L)}|\right\}$$

In one embodiment, the controller of the transmitter sorts the achievable rates of each user in descending order for the next time-slot. The controller targets the $L^{th}$ best achievable rate $C_L$ in the system and sets the transmission rate $R=C_L$. This rate adaptation implicitly makes the scheduling decisions over the time slots and any user with achievable capacity $C \geq R$ successfully recovers the blocks transmitted in the next time slot; otherwise, the user is in outage and observes losses/erasures in that time-slot. Also, in one embodiment, the controller finds the optimal L* such that minimum user throughput is maximized in the long run. This can be done either numerically solving the expression above or by simulating the system for different channel statistics and creating optimum profiles for picking L*. For the i.i.d. case, all the users observe the same long-term throughput capacity.

For the non-IID case, when the channel conditions vary independently, but non-identically, across the users, fairness is taken into account. This situation typically arises from the geographical spread of users. Users who are closer to the base station have typically lower signal attenuation and hence better average signal power than the ones further apart. In one embodiment, Proportional-Fair Sharing can be used, which is described M. Sharif and B. Hassibi, "A Delay Analysis for Opportunistic Transmission in Fading Broadcast Channels," in Proceedings of Infocom'05, Miami, Fla., 2005. In PFS, the transmitter normalizes the achievable capacity of each user in the next slot by the mean capacity of that user. Hence, each user competes against its own mean rather than the other users. In one embodiment, a modified version of the PFS metric is used. This is summarized below.

For the non-IID case, in order to set the rate of multicast channel in the next slot (n+1), the controller first computes $\tilde{C}_i[n+1]=C_i[n+1]/\Gamma_i$ for each receiver i, where $\Gamma_i$ is the normalization factor. $\Gamma_i$ is typically a function of past scheduling history and channel quality of user i. It can be set as $\Gamma_i=E[C_i]$, i.e., the average channel quality user i observes. It can be also set as $\Gamma_i=\Psi_i[n]$, i.e., the average throughput observed by user i. Another common way is to have $$\Gamma_i = \sum_{j=1}^{n} w[j] \cdot I_i[j] \cdot R[j],$$

where w[j] are weighting coefficients with typically $$\sum_{j=1}^{n} w[j] = 1.$$

The original PFS algorithm for instance sets w[n]=α and $w[j]=\alpha(1-\alpha)^{(n-j)}$, where 0<α<1, 1≤j≤(n−1). Then, the controller sorts the normalized capacities as $\tilde{C}_{(1)} \geq \tilde{C}_{(2)} \geq \ldots \geq \tilde{C}_{(L)} \geq \ldots \geq \tilde{C}_{(N)}$. The controller selects the L highest values in the sorted list and constructs the receiver index set $J_L[n+1]=\{j_1, \ldots, j_L\}$ by finding unique j's in the set $\{1, \ldots, N\}$ such that $C_j[n+1]/\Gamma_j = \tilde{C}_{(m)}$ is satisfied for m=1, . . . , L. The multicast channel rate in time slot (n+1) is then computed as:

$$R[n+1] = \min_{j \in J_L[n+1]} C_m[n+1]$$

Note that it is always the case that $R[n+1] \leq C_{(L)}$ and it is typical to have $R[n+1] < C_{(L)}$. In other words, typically more than L users are scheduled in a given time slot.

Thus, in the case of non-I.I.D., in one embodiment, finding the best L* is performed according to:

$$L^* = \operatorname{argmax}\left\{\min_{i \in \{1, \ldots N\}} E_L\left[I_i \cdot \min_{j \in J_>} C_j\right]\right\}$$

When the channel statistics are known a-priori, L* can be computed numerically. When the channel statistics are unknown, the system can be simulated first and L* can be determined online in a dynamic fashion.

Performance Curves

Figure 3:
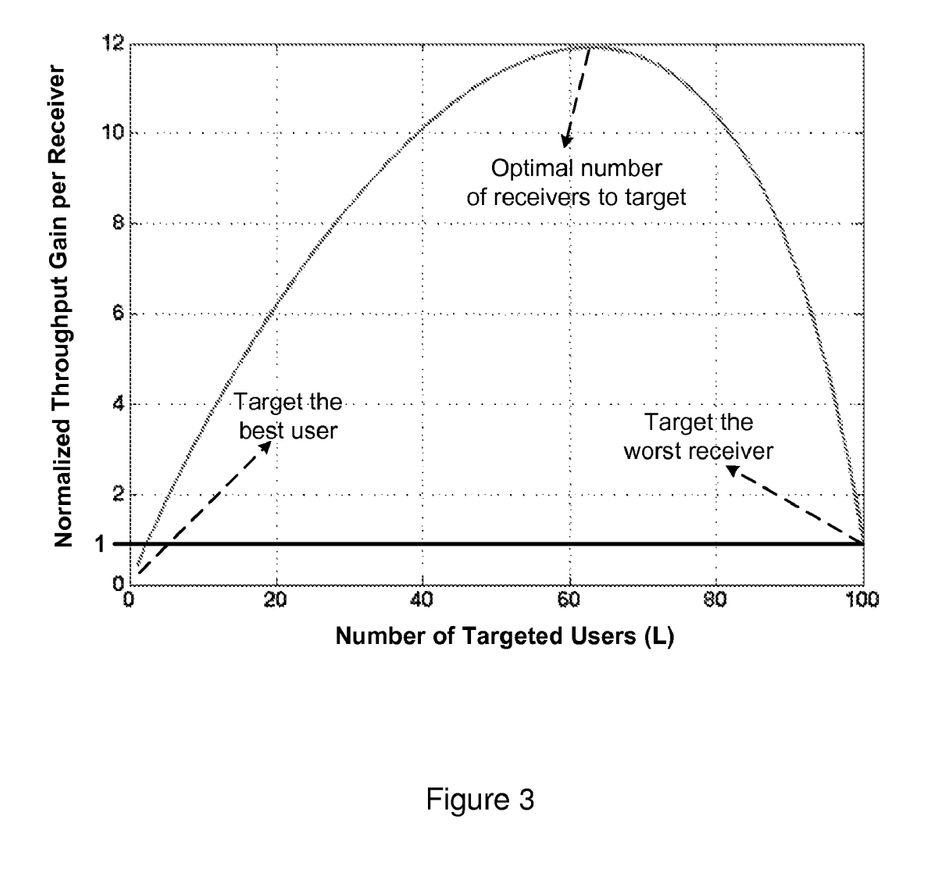
FIG. 3 illustrates the picture for independent and identically distributed (IID) Rayleigh channels across the slots with 10 dB average SNR.
Figure 4:
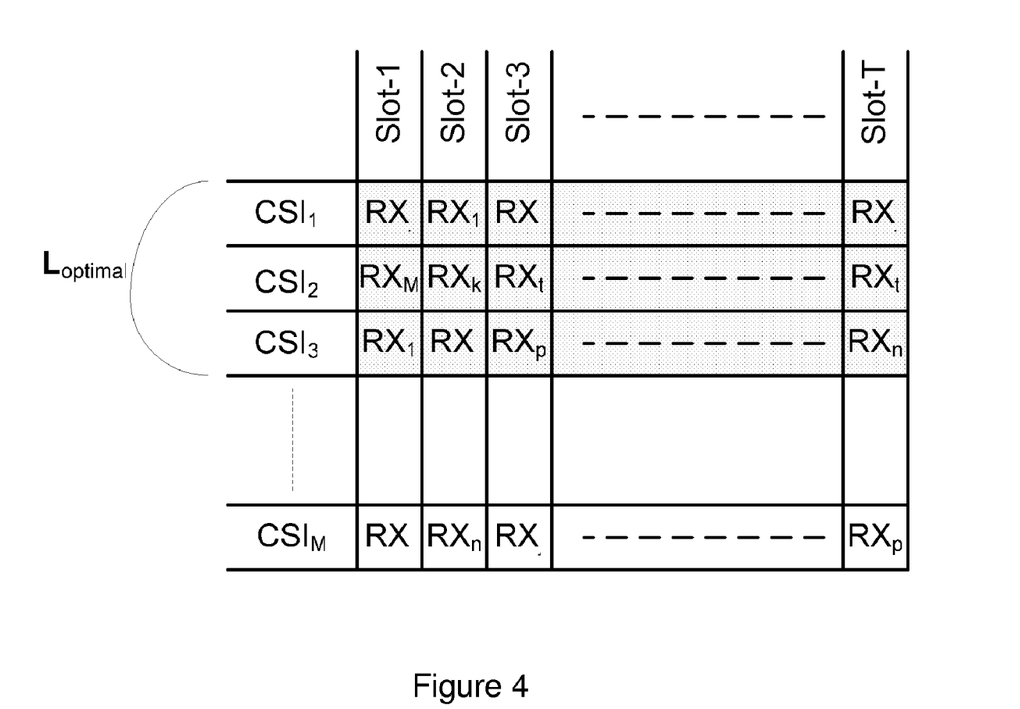
FIG. 4 illustrates the situation where, during every T slots, the channel models are updated and optimized for L.

FIG. 3 is an instance of performance curve corresponding to an IID Rayleigh channel case at 10 dB average SNR and 100-user system. As shown in FIG. 3, users see the same average channel statistics over time. One can easily conclude from FIG. 3 that serving with respect to the best and the worst case users are suboptimal provided that there are enough variations in the channel. In fact, under the given channel conditions, one should always serve the top 63% of the users at any time (i.e., choose the $63^{rd}$ highest SNR value from the most recent measurements and set the transmission rate accordingly). Clearly the top 63% of the users change over the time as users' channel conditions evolve. FIG. 4 depicts the situation where every T slots, the channel models are updated and L is optimized (e.g., L=3 in FIG. 4) for the identified channel models (so far) is used until the model is modified based on new measurements. One can also consider cases where L itself may vary over time. This could be true if the (average) channel statistics change over the broadcast of the information or vary in certain ways from time-slot to time-slot. In other scenarios, it can be that L is fixed.

Usage of Erasure Codes

Note that it is desirable for each receiver to recover the entire broadcast information. When the scheduler opportunistically targets L strongest receivers at a given time slot k and transmits, for example, information X at the corresponding rate $R_k(L,M)$, the remaining (M–L) receivers cannot decode it. Traditional schedulers would resend X at a later transmission opportunity when any of these (M–L) receivers can finally be scheduled since they have better channel conditions. This, however, may significantly reduce the throughput gains achieved by opportunistic multicasting. In one embodiment, erasure codes are used to address the problem.

As described above, one component in multicast scheduling is to make sure that all of the multicast users receive each and every block of the multicast content under normal operations. In one embodiment of the wireless multicast system, the scheduler decides to serve a proper subset of N users in the system. As a result of the scheduling decision, K users can successfully recover the blocks transmitted in the current time slot. From the remaining (N–K) users point of view, there occurs a burst of block erasures, where the burst length is of the same size as the slot length. In one embodiment, the opportunistic multicasting technique described herein creates an artificial erasure channel. That is, in one embodiment of the invention, the transmitter sends a distinct encoding of original information that is a function of X, as well as other information blocks. This is in contrast to the traditional approach where only uncoded original broadcast information is scheduled and sent. By using coded information one can with high probability ensure that every new transmission contains information that is new for each receiver. In this way each received packet assists in recovering new information segments from the original content.

Thus, instead of sending original message blocks, the message blocks are passed through fixed rate or rateless erasure codes and instead schedule the encoding blocks output by the erasure code. In one embodiment, fixed rate and/or rateless erasure codes are used over the scheduling layer. In one embodiment, users with $C<R_{(n)}$ cannot receive during $n^{th}$ time interval (i.e., these users are unscheduled). The intervals a given user is unscheduled are treated as block erasures (i.e., scheduling layer acts like a "controllable" virtual erasure channel). Depending on the implementation strategy and target decoding delays, existing erasure coding techniques may be used. For purposed herein, two of such schemes are described, namely fixed rate erasure codes (e.g., Maximum Distance Separable (MDS) codes such as Reed-Solomon code)s and rateless codes (e.g., Raptor codes).

Fixed rate erasure codes require a careful assessment of the wireless channel and scheduling decisions. If any of these conditions change, they cannot easily accommodate the changes unless they are already designed with a pessimistic view. Therefore, a tight control is required for optimal point of operation and it is best if erasure coding is applied at the base station next to or above the packet scheduler over small number of blocks.

Rateless codes, on the other hand, are quite flexible and can blindly accommodate the throughput fluctuations. If different receivers observe different short-term or long-term throughputs, each receiver achieves its own throughput and does not create a bottleneck for other users. They can be applied in the application layer at the remote server side where the whole content is available or it can be applied at the base-station after enough buffering if server does not support application layer FEC. Rateless codes can be also used as an inefficient fixed rate code by enforcing a rate limit.

An Example of a Controller

Figure 5:
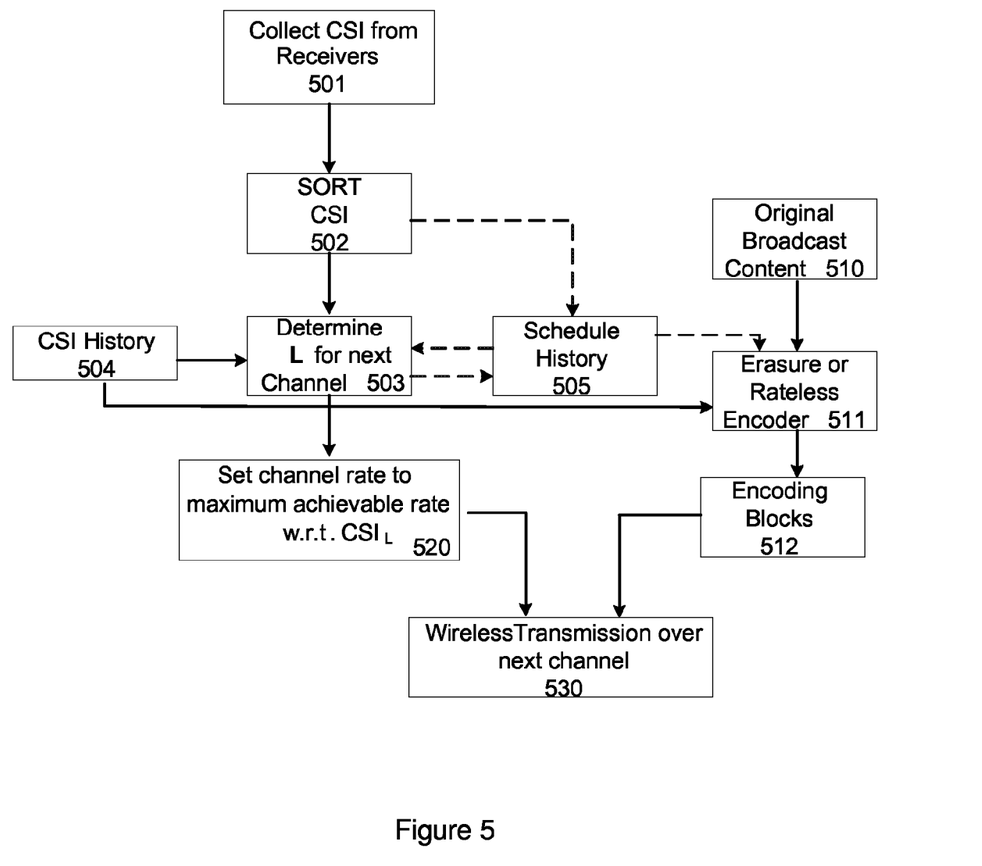
FIG. 5 is a data flow diagram of one embodiment of a transmitter.

FIG. 5 is a data flow diagram of one embodiment of a controller to control a transmitter for opportunistic multicasting with fixed rate or rateless erasure codes. Each of the processing blocks may comprise processing which may comprise hardware (circuitry, dedicated logic, etc.), software (such as is run on a general purpose computer system or a dedicated machine), or a combination of both. These processing blocks can be physically located in one device or they can be physically distributed to more than one device.

Referring to FIG. 5, a feedback mechanism collects channel state information (CSI) (e.g., SNR or SINR measurements, achievable channel rates, etc.) from the receivers back and sends it back to the transmitter (processing block 501). The CSI is sorted at processing block 502 and stored as part of the schedule history at processing block 505. In one embodiment, scheduler history encompasses at least the information on which receivers have been scheduled so far (or for last T seconds, epochs, etc.), and what has been the average throughput of each receiver (it can be windowed/filtered throughput). In one embodiment, the controller stores the history of CSI measurements (processing block 504) to build and update the channel model for the current snapshot of the network configuration that depends on the number of receivers in the system, their mobility, location, etc. In one embodiment, the controller stores the statistics of the achievable channel rates of each user. This can be done in at least two ways. In one method, the transmitter obtains the CSI information and history in terms of received signal to interference and noise ratio to determine the achievable channel rate of each receiver. In the other method, the transmitter directly receives the feedback from the receivers in terms of the rate achievable at the receivers.

Given the model and a sorted array of the current channel state information in the descending order, the controller determines the optimal number of receivers L (503) and, based on the optimal number of receivers L, selects the target CSI to set the transmission rate (processing block 520). Since the channel model can evolve significantly over the time, the optimal L value also becomes time-varying in general. In one embodiment, the optimal "L" also considers the reliability of the estimate or accuracy of past information, in which case the targeted number of receivers is itself an estimate or some probabilistic goal.

In one embodiment, selecting the target CSI in a sorted array of CSI's from all the receivers determines which subset of receivers is targeted to receive in the next sequence of transmissions. Assuming these receivers do not experience high fluctuations in their channel states, the subset of users targeted for the next sequence of transmissions are implicitly scheduled to receive a transmission.

In another embodiment, the controller uses a functional of current CSI and past CSI history rather than the current CSI itself to sort the receivers and decide on the targeted subset of receivers. For instance, in one embodiment, each user's most recent SNR measurement is normalized with respect to its average SNR observed so far, and then the transmitter uses the normalized SNR to sort the receivers. In another embodiment, the current CSI and past CSI history are mapped onto achievable transmission rates for the current time-slot and the past time slots. In another case, in one embodiment, users are sorted directly with respect to their current achievable rates (or normalized rates), where the rate is in general a non-trivial function of channel state information. Then, the ordering of the transmission rates is used to decide on the targeted subset of receivers. Similarly, in another embodiment, once the current achievable rate and the rate history are computed, the users are measured in terms of their proximity to each user's peak transmission rate and then they are prioritized by the controller accordingly. In one embodiment, this is measured by normalizing the current channel rate of a user with respect to its average channel rate. In another embodiment, the current channel rate of a user is normalized with respect to its average throughput. The average throughput can be computed as a weighted average over a time-window, where the throughput values achieved during the more recent time slots bear a higher weight in average computation. The examples can be expanded to other functions of CSI and achievable rates. One can also explicitly use per user inter-scheduling times, per user buffer backlogs at the transmitter and at the receiver to sort the users on top of the current channel quality.

In one embodiment, the controller keeps track of these subsets over the time and the already transmitted information up to now is used to form a schedule history 505. In another embodiment, the controller can also receive feedback directly from the receivers about what information is received or not to modify schedule history 505.

In one embodiment, the past schedules (e.g., past L values and CSI history together) can be used in decisions of selecting the optimal L. This information is provided by schedule history 505.

In one embodiment, the original content (510) is passed through a fixed rate or rateless erasure code to generate encoding blocks 512 (e.g. bits, symbols, packets, etc.) using erasure or rateless encoder (511), where the CSI history might be used to select the rate of the erasure code. Encoding blocks 512 then passed to the physical layer of the transmitter, with a transmission rate already determined by the targeted CSI (i.e., subset of receivers) for wireless transceiver over the next channel (530). In another embodiment, the encoding blocks 502 are generated by rateless codes in which each successfully recovered encoding block carries new information to any receiver, where the new information is any received information that is innovative in the sense that it is not redundant (i.e., it cannot be recovered from the information bits that are received so far).

In one embodiment, schedule history 505 is used as an input to erasure code/rateless code encoder 511 along with the original content 510 and CSI history 504. More specifically, one can keep a queue for each receiver to store the uncoded blocks of the multicast content that are not already recovered by that receiver (from the scheduling history and past encodings one can immediately tell which blocks are still not recovered or the receivers can explicitly feedback this information). Then the encoder asks which encoding across these queues of currently scheduled receivers can deliver the most information. For instance, let us say transmitter scheduled x (uncoded information) in the first time slot and receivers A and B recovered it, but not receiver C. Suppose, in the second slot we scheduled y (again uncoded) for receivers B and C. If receivers A and C are scheduled in the current slot, then an encoding x+y can ensure receiver A recovers y and receiver C recovers x. In this way, the scheduling history in the current slot is used as well as which receiver is scheduled in the current slot.

In other embodiments, schedule history 505 is not used, in which case use of rateless codes can ensure that regardless of schedule history 505 with high probability innovative information is sent.

In different embodiments, each channel can correspond to a time slot, a frequency sub-band, a spreading code, or a combination of one or more of these channelization techniques. The variation of channel qualities for a given receiver or for many receivers can be in the time domain, in the frequency domain (e.g., OFDM sub-bands), in the code domain (e.g., CDMA spreading code), or in any subset of these domains.

There are a number of advantages associated with one or more embodiments of the invention. For example, embodiments of the present invention boost the user and system throughput for broadcasting information from one transmitter to many receivers by combining opportunistic multicasting and coding. Traditional systems in general target the worst case user to adapt the transmission rate. Opportunistic multicasting feature enables one instead to focus on a smaller subset of users and achieve much higher instantaneous transmission rates. The proposed solutions for opportunistic multicasting in the literature separately solve the packet scheduling problem by implicitly or explicitly keeping track of which receivers have not already received a particular packet so far and retransmit that packet in a later transmission opportunity hence wasting the resources. They also focus on only one case for opportunistic multicasting by focusing on the median user. One embodiment of the present invention, on the other hand, uses an additional mechanism of coding packets and simplifying the scheduling operation.

Moreover, one embodiment of the present invention optimizes the opportunistic multicasting performance further by computing the optimal target CSI for rate adaptation. Using rateless codes at the encoding stage rather than a fixed rate erasure code also allows the receivers with higher throughput on the short run to take advantage of that. One embodiment of the present invention also has much lower complexity in terms of scheduling (polynomial time due to erasure/rateless code encoders) as opposed to exponential time of traditional schedulers proposed for opportunistic multicasting in the literature.

An Example of a Computer System

Figure 6:
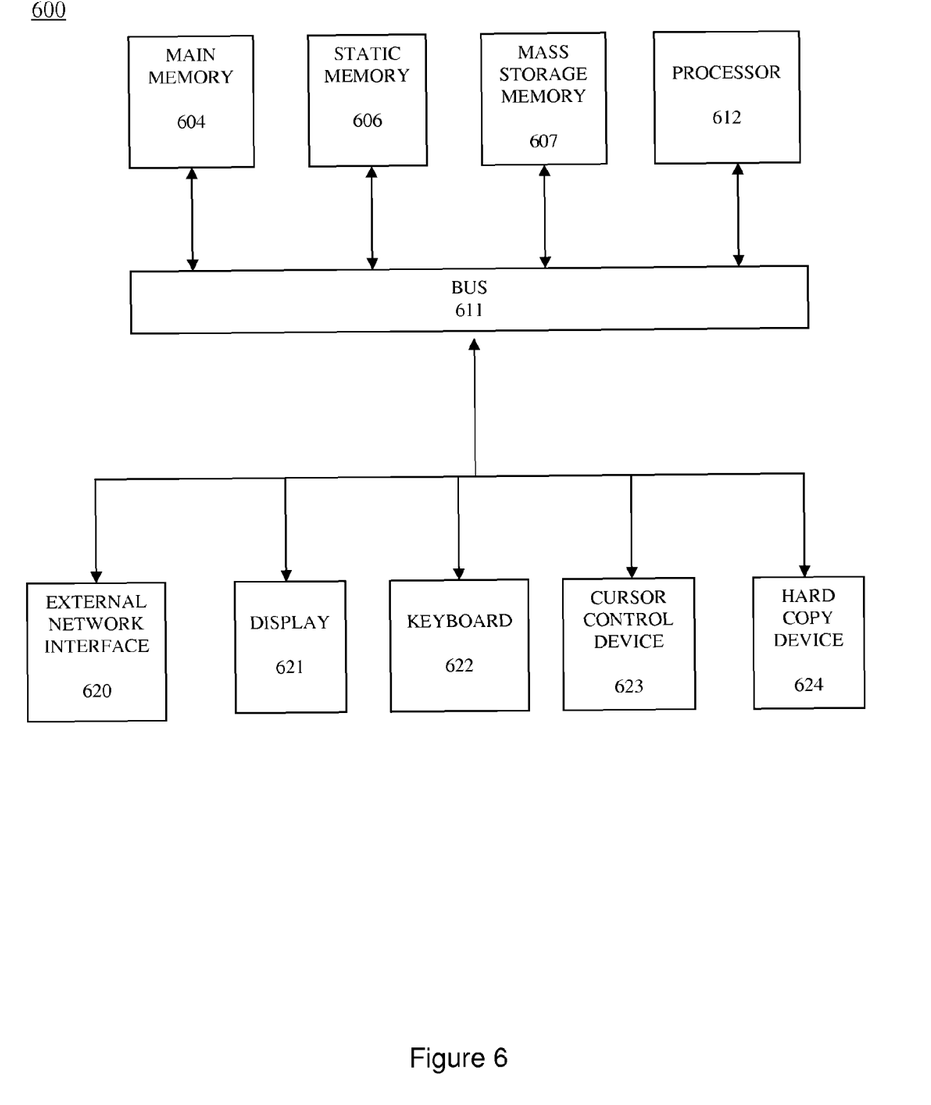
FIG. 6 is a block diagram of an exemplary computer system.

FIG. 6 is a block diagram of an exemplary computer system that may perform one or more of the operations described herein. Referring to FIG. 6, computer system 600 may comprise an exemplary client or server computer system. Computer system 600 comprises a communication mechanism or bus 611 for communicating information, and a processor 612 coupled with bus 611 for processing information. Processor 612 includes a microprocessor, but is not limited to a microprocessor, such as, for example, Pentium™, PowerPC™, Alpha™, etc.

System 600 further comprises a random access memory (RAM), or other dynamic storage device 604 (referred to as main memory) coupled to bus 611 for storing information and instructions to be executed by processor 612. Main memory 604 also may be used for storing temporary variables or other intermediate information during execution of instructions by processor 612.

Computer system 600 also comprises a read only memory (ROM) and/or other static storage device 606 coupled to bus 611 for storing static information and instructions for processor 612, and a data storage device 607, such as a magnetic disk or optical disk and its corresponding disk drive. Data storage device 607 is coupled to bus 611 for storing information and instructions.

Computer system 600 may further be coupled to a display device 621, such as a cathode ray tube (CRT) or liquid crystal display (LCD), coupled to bus 611 for displaying information to a computer user. An alphanumeric input device 622, including alphanumeric and other keys, may also be coupled to bus 611 for communicating information and command selections to processor 612. An additional user input device is cursor control 623, such as a mouse, trackball, trackpad, stylus, or cursor direction keys, coupled to bus 611 for communicating direction information and command selections to processor 612, and for controlling cursor movement on display 621.

Another device that may be coupled to bus 611 is hard copy device 624, which may be used for marking information on a medium such as paper, film, or similar types of media. Another device that may be coupled to bus 611 is a wired/wireless communication capability 625 to communication to a phone or handheld palm device.

Note that any or all of the components of system 600 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An apparatus for use in a wireless multicast system having a plurality of receivers, the apparatus comprising:
    a storage to store at least one of channel state and rate information received from the plurality of receivers;
    a transmitter to broadcast information over a broadcast channel to receivers in the plurality of receivers for each transmission time slot; and
    a controller coupled to the storage and the transmitter to adapt transmission rates of the transmitter to cause the transmitter to transmit at different rates for different transmission time slots, wherein the controller operable to:
        determine a subset of receivers from a sorted list of the plurality of receivers for each transmission time slot, where the sorted list is sorted based on achievable rates of each receiver for said each transmission time slot, the subset of receivers being those receivers targeted to reliably receive a broadcast transmission over the broadcast channel during said each transmission time slot given channel state information history, and
        set a transmission rate at which the transmitter broadcasts the information in a multicast manner to the subset of receivers, based on the channel state information associated with the broadcast channel and received from the plurality of receivers and based on the subset of receivers, the transmission rate being the lowest achievable rate for receivers in the subset of receivers, so that receivers in the subset of receivers can successfully recover the broadcast information for said each transmission time slot while receivers of the plurality of receivers not in the subset of receivers are allowed to observe block erasures in said each transmission time slot, and
    wherein the controller comprises an encoder to generate encoded blocks from the broadcast information for said each transmission time slot, using one of a group consisting of a fixed rate erasure code and a rateless code, so that the broadcast information can be recovered by all the receivers of the plurality of receivers after receiving a suitable number of encoded blocks against the erasures caused by targeting different subsets of receivers across different time slots and further wherein the transmitter is to transmit the encoded blocks to the subset of receivers.

2. The apparatus defined in claim 1 wherein the controller adapts transmission rates of the transmitter by setting the transmission rate of the transmitter to satisfy the worst channel condition among the subset of receivers selected by the controller.

3. The apparatus defined in claim 1 wherein the controller identifies the subset of receivers by
    sorting the plurality of receivers based on individual channel state information to create the sorted list;
    determining, based on optimal order information, a value in the sorted list; and
    determining the subset of receivers to include all the receivers having an achievable transmission rate greater or equal to the value in the sorted list, given at least one of past channel state information history and a schedule of transmissions associated with all receivers in the plurality of receivers.

4. The apparatus defined in claim 3 wherein the controller is operable to compute a function based on the channel state information of each receiver and sort the receivers in the plurality receivers with respect to results of computing the function.

5. The apparatus defined in claim 4 wherein the function is based on channel state information and information related to past scheduling of transmissions to receivers of the plurality of receivers.

6. The apparatus defined in claim 5 wherein the information related to past scheduling comprises average throughput to each of the receivers.

7. The apparatus defined in claim 5 wherein the function corresponds to the capacity of each receiver of the plurality of receivers at the current time.

8. The apparatus defined in claim 5 wherein the function corresponds to the capacity of each receiver at current time in relation to an expanded capacity.

9. The apparatus defined in claim 5 wherein the function corresponds to the capacity of each receiver at the current time in relation to the throughput of the receiver.

10. The apparatus defined in claim 1 wherein the controller selects the subset of receivers by:
    sorting achievable rates of each receiver in the plurality of receivers in an order for a next time-slot into a list, and
    setting the transmission rate equal to one achievable rate of one receiver in the list, the one achievable rate being the lowest achievable rate in a group that includes the highest achievable rates in the list, which are associated with a predetermined number receivers; and further comprising scheduling transmission of data for the next time-slot to receivers having a reliable transmission rate at or above the set transmission rate.

11. The apparatus defined in claim 1 wherein the controller adapts transmission rates of the transmitter by performing rate adaptation for multicast transmissions, including, for at least one multicast transmission to occur during a time slot, setting the transmission rate of the transmitter, the transmission rate being that which serves the best L users in the time slot; and further wherein the transmitter transmits at the transmission rate for an entire duration of the time slot.

12. The apparatus defined in claim 11 wherein the controller is to
compute a capacity per channel for each receiver; and
sort normalized versions of the capacities per channel for the group of receivers;
select a predetermined number of receivers from the sorted group of receivers based on their sorting, wherein the transmission rate is set according to a lowest transmission rate among transmission rates of receivers in the predetermined number of receivers.

13. The apparatus defined in claim 1 wherein the fixed rate erasure code uses the channel state information and the schedule history to generate the encoded blocks.

14. The apparatus defined in claim 1 wherein the rateless code uses the channel state information and the schedule history to generate the encoded blocks.

15. A wireless multicast system comprising:
a transmitter to send broadcast information over a broadcast channel;
a plurality of nodes to receive transmissions over the broadcast channel; a controller to perform rate adaptation to cause the transmitter to transmit at different rates depending on channel state received from a receiver and targeted reliability that exists, wherein the controller is to
determine a subset of receivers from a sorted list of the plurality of receivers for each transmission time slot, where the sorted list is sorted based on achievable rates of each receiver for said each transmission time slot, the subset of receivers being those receivers targeted to reliably receive a broadcast transmission over the broadcast channel during said each transmission time slot given channel state information history,
set a transmission rate at which the transmitter broadcasts the information in a multicast manner to the subset of receivers, based on the channel state information associated with the broadcast channel and received from the plurality of receivers and based on the subset of receivers, the transmission rate being the lowest achievable rate for receivers in the subset of receivers, so that receivers in the subset of receivers can successfully recover the broadcast information for said each transmission time slot while receivers of the plurality of receivers not in the subset of receivers observes block erasures in said each transmission time slot,
generate sufficient number of encoded blocks from the broadcast information for said each transmission time slot, using one of a group consisting of a fixed rate erasure code and a rateless code, so that the broadcast information can be recovered by all the receivers of the plurality of receivers after receiving a suitable number of encoded blocks against the erasures caused by targeting different subsets of receivers across different time slots and
cause the transmitter to transmit the encoded blocks.

16. The system defined in claim 15 wherein the controller provides rate adaptation by targeting a subset of receivers at each transmission opportunity where a transmission rate is set to satisfy the worst channel condition among the receivers of the targeted subset.

17. A method comprising:
receiving channel state information of a plurality of receivers in a wireless multicast system; and
adapting transmission rates of a transmitter to cause the transmitter to transmit at different rates for different transmission time slots, including
determining a subset of receivers from a sorted list of the plurality of receivers for each transmission time slot, where the sorted list is sorted based on achievable rates of each receiver for said each transmission time slot, the subset of receivers being those receivers targeted to reliably receive a broadcast transmission over a broadcast channel during said each transmission time slot given channel state information history,
setting a transmission rate of the transmitter broadcasts information in a multicast manner over a broadcast channel to the plurality of receivers for each transmission time slot, based on the channel state information associated with the broadcast channel and received from the plurality of receivers and based on the subset of receivers in the plurality of receivers targeted to reliably receive a broadcast transmission over the broadcast channel during said each transmission time slot, so that receivers in the subset of receivers can successfully recover the broadcast information for said each transmission time slot while receivers of the plurality of receivers not in the subset of receivers observes block erasures in said each transmission time slot; and
generating encoded blocks from the broadcast information for said each transmission time slot, using one of a group consisting of a fixed rate erasure code and a rateless code, so that the broadcast information can be recovered by all the receivers of the plurality of receivers after receiving a suitable number of encoded blocks against the erasures caused by targeting different subsets of receivers across different time slots; and
wirelessly transmitting the encoded blocks using the transmitter.

18. The method defined in claim 17 wherein adapting transmission rates of the transmitter comprises setting the transmission rate of the transmitter to satisfy the worst channel condition among the subset of receivers.

19. The method defined in claim 17 further comprising identifying the subset of receivers by
sorting the plurality of receivers based on individual channel state information to create the sorted list;
determining, based on the optimal order information, a value in the sorted list; and
determining the subset of receivers to include all the receivers having an achievable transmission rate greater or equal to the value in the sorted list, given at least one of past channel state information history and a schedule of transmissions associated with all receivers in the plurality of receivers.

20. The method defined in claim 17 further comprising selecting the subset of receivers by:
sorting achievable rates of each receiver in the plurality of receivers in an order for a next time-slot into a list, and
setting the transmission rate equal to one achievable rate of one receiver in the list, the one achievable rate being the lowest achievable rate in a group that includes the highest achievable rates in the list, which are associated with a predetermined number receivers; and further comprising scheduling transmission of data for the next time-slot to receivers having a reliable transmission rate at or above the set transmission rate.

21. The method defined in claim 17 wherein adapting transmission rates of the transmitter comprises:

performing rate adaptation for multicast transmissions, including, for at least one multicast transmission to occur during a time slot, setting that transmission rate of the transmitter, the transmission rate being that which serves the best L users in the time slot; and transmitting at the transmission rate for an entire duration of the time slot.

22. The method defined in claim 21 further comprising:

computing a capacity per channel for each receiver; and sorting normalized versions of the capacities per channel for the group of receivers;

selecting a predetermined number of receivers from the sorted group of receivers based on their sorting, wherein the transmission rate is set according to a lowest transmission rates among transmission rates of receivers in the predetermined number of receivers.

23. The method defined in claim 17 wherein the fixed rate erasure code uses the channel state information and the schedule history to generate the encoded blocks.

24. The method defined in claim 17 wherein the rateless code uses the channel state information and the schedule history to generate the encoded blocks.

* * * * *